United States Patent [19]

Wada

[11] 4,336,767

[45] Jun. 29, 1982

[54] SURFACE LAYER STRUCTURE OF AN INK TRANSFER DEVICE

[75] Inventor: Hiroshi Wada, Kobe, Japan

[73] Assignee: Bando Chemical Industries, Ltd., Kobe, Japan

[21] Appl. No.: 63,727

[22] Filed: Aug. 6, 1979

[30] Foreign Application Priority Data

Aug. 4, 1978 [JP] Japan .................................. 53-95600
Aug. 24, 1978 [JP] Japan ................................ 53-103417

[51] Int. Cl.[3] .......................... B32B 3/26; B41K 1/50; B41K 1/52; B41K 1/54

[52] U.S. Cl. .................................... 118/264; 101/333; 118/265; 118/268; 401/196; 401/198; 428/212; 428/213; 428/215; 428/218; 428/315.5; 428/315.7; 428/315.9; 428/316.6; 428/321.3; 428/327; 428/909; 428/914

[58] Field of Search ........................ 101/335, 368, 333; 264/109, 112, 113, 122; 401/196, 197, 198; 427/146, 195; 428/212, 213, 215, 218, 305, 307, 327, 914, 108, 306, 909, 315.5, 315.7, 315.9, 316.6, 321.3; 118/264-266, 268

[56] References Cited

U.S. PATENT DOCUMENTS

| | | | |
|---|---|---|---|
| 2,526,311 | 9/1943 | Wilson | 154/43 |
| 3,413,184 | 11/1968 | Findlay et al. | 428/305 |
| 3,442,681 | 5/1969 | Newman et al. | 428/305 |
| 3,617,328 | 11/1971 | Newman | 428/914 |
| 3,628,979 | 12/1971 | Newman et al. | 428/307 |
| 3,681,186 | 8/1972 | Findlay et al. | 428/305 |
| 3,971,315 | 7/1976 | Hansen | 428/311 |

*Primary Examiner*—Bruce H. Hess
*Attorney, Agent, or Firm*—Moonray Kojima

[57] ABSTRACT

An ink transfer device comprising an ink transfer surface layer which may be connected to a porous ink storage body, such as used in a printing device or apparatus, having a porous structure with continuous pores therein and 8 to 30% porosity, and a surface ruggedness of less than 20 microns and ink mobilizable and storable porous ink storage body. The structure of the ink transfer surface layer and the ink storage body are produced respectively and successively by heat compression in a mold, thermoplastic powder of less than 50 microns diameter and of a little larger than the former ones. The inventive ink transfer surface layer enables uniform and efficient transfer of ink from the device even after repeated impressions of the device.

4 Claims, 7 Drawing Figures

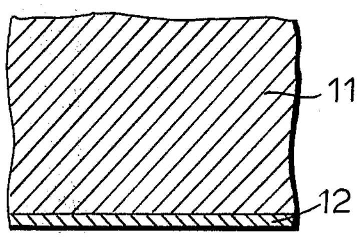
FIG. 3
FIG. 4
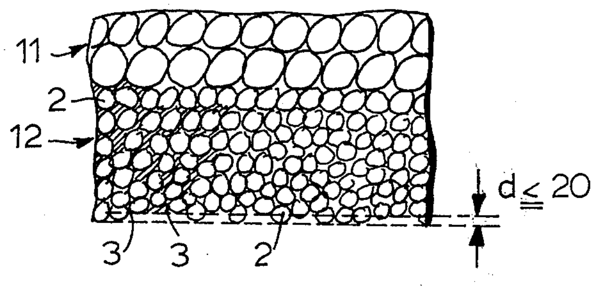
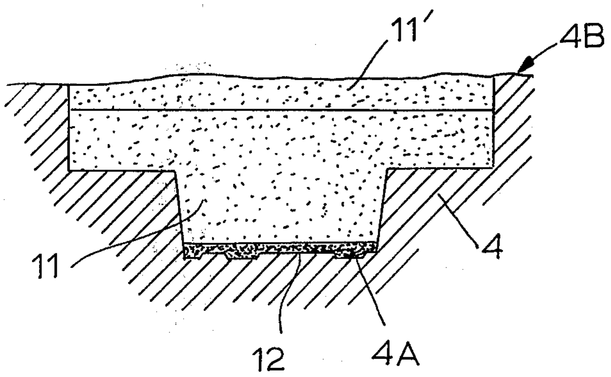
FIG. 5
FIG. 6
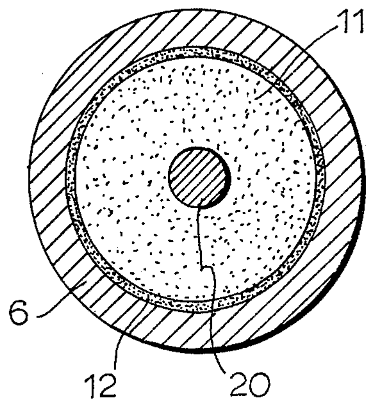

SURFACE LAYER STRUCTURE OF AN INK TRANSFER DEVICE

BACKGROUND OF THE INVENTION

This invention relates to a printing or ink transfer layer, such as used in a printing device or apparatus, and more particularly to a novel ink transfer surface layer structure and its associated ink storage body. A printing member or other ink transfer surface layer, such as in ink roll, such as employed in a typewriter or register, normally has a porous ink transfer surface layer attached to an ink storage body, from which ink is supplied through the surface layer to form impressions on paper or other subject material used for printing.

The following prior methods have been employed to produce porous materials having cavities for use as an ink storage and ink transfer surface layer. (a) A method wherein after adding foaming agent to rubber containing material, the resultant material is vulcanized in a mold. (b) A method comprising the blending of salt and rubber containing material, vulcanizing the blend in a mold and then extracting the salt therefrom. (c) A method wherein the abovementioned methods are combined. (d) A method comprising the mixing of thermoplastic elastomer and salt, molding the resulting mixture in a mold by melting and extracting salt therefrom. (e) A method comprising the admixing of foaming agent and air bubbles into a plastic sol, such as polyvinyl chloride sol, and then subjecting the resultant to compressive molding under heat in a mold.

As can be seen in FIGS. 1A and 1B, the pores of a porous body produced by using prior art methods (a) through (e) have pore diameters which are not uniform and which are discontinuous. In the case of method (a) or (c), there are produced large pores a (see FIG. 1A) which are created when salt is extruded out, or when air bubbles are communicated between themselves with assistance of tiny outlet path cavities created by the salt being extruded out. In FIG. 1B, pores a' are created by foaming agent communicating mutually at their side wall portions, such as produced by methods (b), (d) and (e). In these cases, the diameter of pores a differs from that of the communicating paths b. Thus, there are generated capillaries having discontinuously changed diameters. Accordingly, ink flowing into the capillaries, has a tendency to stay in pores a, a', and mobility of the ink in the capillaries is liable to be hindered. Consequently, operation of the printing member or ink roll have an ink storage body and an ink transfer surface layer with such a structure, has to be frequently suspended during repeated printing or ink transfer. This is because the amount of ink moving from the ink storage body to the ink transfer or printing surface decreases with each repeated cycle and the amount of ink which is transfered from the ink transfer surface to the subject, such as paper, to be printed, decreases and the shade of ink on the impressed subject becomes lighter with each repeated cycle. The ink path having dissimilar and irregular diameters, hinders the smooth movement or flow of the ink.

Therefore, even though there may be a satisfactory amount of ink in the storage body, the shade of the symbol printed or quantity of ink transfered becomes lighter with each repeated printing or ink transfer cycle. Thus, it is necessary with prior art devices to wait for the ink to permeate from the storage body to the ink transfer surface after each printing impression and before the next impression is made. It is thus necessary to stop the printing or ink transfer after each impression. Efficiency and speed are thus substantially reduced.

Furthermore, until the instant invention, there was a defect or deficiency in that, upon start of printing or ink transfer, after its suspension, the shade of the character printed or quantity of ink transfered, was apt to become lighter with the increased number of times the printing or ink transfer was repeated. Also, the non-uniform mobility of the ink was found to affect the inner side part of the ink storage body so that the shade of the character printed immediately after the suspension become lighter with the number of times the printing was repeated. (See the bottom curve in FIG. 2, for an illustration of this effect).

Moreover, in the prior art, in order to regulate the shade density of the character or symbol printed or quantity of ink transfered, means were employed to harden the surface layer, or to place a layer on the back side of the surface layer to retard occurence of distortion. The latter means, disadvantageously, reduced ink mobility and hence promoted depression of shade depth of the symbol or character printed or the quantity of ink transferred.

SUMMARY OF THE INVENTION

Accordingly, an object of the invention is to eliminate the aforementioned and other disadvantages and deficiencies of the prior art.

Another object is to provide a suitable structure for an ink transfer surface, such as would be used in printing, which would efficiently and uniformly supply ink at a constant predetermined rate from an ink storage body.

A further object is to prevent excess flow of ink through an ink transfer surface layer, and to prevent uneconomical consumption of ink.

A still further object is to provide an ink transfer surface which would not cause unsatisfactory movement of ink therethrough, so that repeated continuous printing using the ink transfer surface can be carried out and produce uniform printing or ink transfer.

The foregoing and other objects are attained in the invention which encompasses a novel structure for an ink transfer surface layer and an ink storage body connected thereto, such as used in printing equipment, and a method of producing same. A thermoplastic resin powder is placed in a mold which has the desired symbol or character or other printing surface, and then subjected to heating and compression until the desired impressed surface is formed on the printing surface thereof. The powder is preferably less than 50 microns in diameter for porous resins, and less than 30 microns for other types of resins. Then, a larger sized powder is placed on top of the layer, and then heated and compressed to form the ink storage body. The heating time, temperature and pressure are suitably selected to enable formation of the desired properties of the surface layer. The powder by compression is joined to each other both in the surface layer and the storage body, with the powder particles of the surface layer and storage body being joined to each other to form a unitary structure. Also, the surface layer and the storage body have continuous pores therein. Thus, advantageously, the mobility of the ink from the storage body and through the ink transfer surface layer is uniform and without hinderance. The ink transfer surface layer has a porosity (that is volume ratio of air cavity pore space to surface layer bulk) of preferably between 8 to 30%, and more preferably between 10 to 25%. The porosity of the storage body may be greater. The printing surface has a ruggedness depth (that is the variation measured from the bottom of the valley to the top) of less than 20 microns, preferably, and more preferably less than 10 microns, for uniform flow rate of the ink. The thickness of the printing surface layer may preferably be within the range of 0.2 mm to 2.0 mm, for the most efficient ink transfer.

Advantageously, the compression of resin powder produces a joined or connected mass which has continuous pores therein and which enables the efficient and uniform uninterrupted flow of ink from the storage body and through the ink transfer surface layer. The entire ink transfer surface layer and the storage body are advantageously made of the same material and is of unitary structure. The size of the powder used to form the storage body may be larger than that used for the ink transfer surface layer. Also, the porosity of the storage body may be greater than the porosity of the ink transfer surface layer. A two stage heat-compression cycle is used to form the two connected body and layer, with simplicity and economy and efficiency. By controlling the particle size and compression pressure, the ruggedness of the printing surface can be readily controlled to be less than 20 microns and even less than 10 microns. This advantageously prevents over-inking and over consumption of ink.

A feature of the invention is an ink transfer surface layer, wherein resin powder having less 50 microns (for porous resins) or less than 30 microns (for other types of resins), is placed in a mold, then heat compressed, thereby to produce an ink transfer surface layer connected to an ink storage body, with continuous pores therein, and with the porosity of the ink transfer layer being between 8 to 30%, the ruggedness of the printing surface being less than 20 microns, and the thickness of the surface layer being between 0.20 and 2.00 mm.

A further feature is the use of a porous resin powder having a diameter of less than 50 microns.

Another feature is a unitary structure comprising the ink transfer surface layer and the ink storage body, wherein the porosity of the layer is between 8 and 30%, with the porosity of the body being larger, and wherein both the body and layer have pores which are continuous with respect to each portion and with respect to each other.

Another feature is the porosity of the ink transfer surface layer being between 10 to 25%.

BRIEF DESCRIPTION OF THE DRAWING

FIG. 3 is a cross sectional view depicting an embodiment of the invention.

FIG. 4 is a partially magnified cross sectional view of FIG. 3.

FIG. 5 is a cross sectional view depicting a mold used to produce a printing surface in accordance with the invention.

FIG. 6 is a cross sectional view depicting an ink roll produced in accordance with the invention.

DETAILED DESCRIPTION OF PREFERRED EMBODIMENTS

Figure 1A:
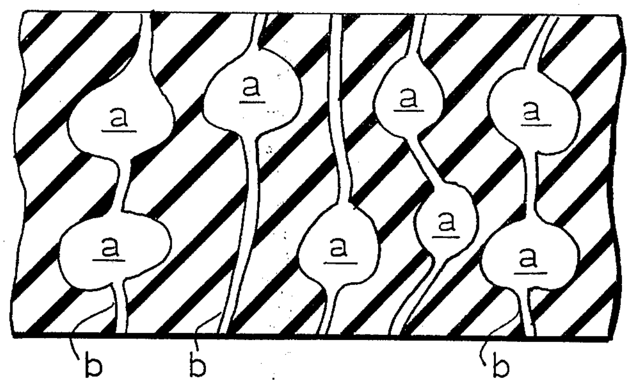
(PRIOR ART) FIG. 1a
FIGS. 1A and 1B depict surface layer structures produced by prior art methods.
Figure 1B:
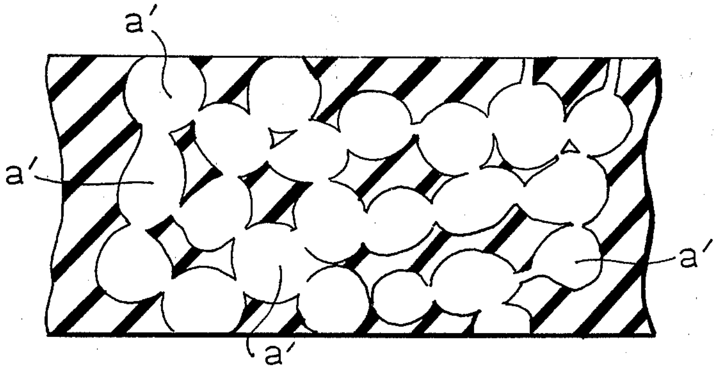
(PRIOR ART) FIG. 1b

Turning now to FIG. 3, ink transfer surface layer 12 is formed on ink storage body 11, both of which are made of a porous material as will be explained further hereinbelow. Both body 11 and layer 12 are shown in FIG. 4 which is magnified many times to show the structural details thereof. Ink transfer surface layer 12 comprises powders 2 and continuous pores or cavities 3 therebetween. According to the present invention, the ratio of the volume of the continuous cavities 3 and that of the printing surface layer 12 (called "porosity") is preferably between 8 and 30%, and more preferably between 10 and 25%, and the ruggedness depth "d" (see FIG. 4) is preferably less than 20 microns, and more preferably less than 10 microns. The surface is not completely smooth because of the powder particles and the spaces therebetween. However, provided the ruggedness depth d is not more than 20 microns, the surface will transfer ink in a uniform and satisfactory manner.

The above mentioned powder may be a fine powder of heat hardening resin or thermoplastic resin, which may be produced by one or more of the following methods, such as (a) during manufacturing of the resin; (b) by finely powdering pellets or powders thereof; or (c) by finely powdering porous resins.

According to the invention, the diameter of the powder particles is preferably less than 50 microns for porous resins, and preferably less than 30 microns for other types of resins. The fine powder produced by finely powdering porous resins may be obtained from a number of different sources, such as by powdering porous resins as such; use of fine powder obtained from foamed urethane resin having continuous cavities; using a porous resin obtained by known dry coagulation method; using a porous resin obtained by known dry coagulation method; using a porous resin obtained by known wet coagulation method; using a porous resin having fine pores obtained by polymerization in a poor solvent system. These porous resins may be have diameters less than 20 microns.

The ink transfer surface layer, such as used in an ink roll or printing device, is preferably manufactured in a manner as explained in connection with FIG. 5, which depicts a cross section comprising a mold 4 having the desired printing surface portion 4A and a top flat surface 4B. Into the mold 4 is filled powder of thermoplastic resin or heat hardening resin to form an ink transfer surface layer 12 and an ink storage body 11. A suitable ink transfer surface layer 12 may be first formed by placing resin into the female mold 4, then placing a male mold thereon, and the applying suitable heat and pressure to compress the powder particles together and form the desired printing surface at the mold portion 4A. The particles are connected together to form a mass with cavities between the particles in a continuous pattern. Then, another layer of powder particles 11' is added thereon, and similar heat compression is applied to form the ink storage body 11. The powder particles of the body 11 are similarly joined together and have cavities continuously therein. The cavities or pores are interconnected with the cavities or pores of layer 12. Thus, ink stored in the ink storage body 11 can readily flow through the cavities and into and through the ink transfer surface layer 12. As will be seen in the Examples, the powder particles used in the second charge forming layer 11 may be of a larger diameter than the particles used to form the layer 12. Thus, also, the porosity of the ink storage body may be greater than that of the layer 12. Advantageously, in forming the body 11 and layer 12 in this manner, the air path holes or cavities have less diameter change and are substantially continuous. The pores 3 allow smooth movement or flow of the ink.

We have discovered that it is preferable to control the porosity of the ink transfer surface layer to be within the range of 8 to 30%. When this ratio exceeds 30%, excess ink supply would occur and even if this printing portion surface layer is constructed with harder material to prevent distortion, excess ink supply flow would occur. The ratio can be controlled by suitable control of the compression pressure used to form the surface during molding. The compression pressure, heating temperature and time are suitably determined to obtain the surface ruggedness and porosity required. They are also dependent upon the particular resin employed and particle size. These factors are readily determinable by those skilled in the art.

The thickness of the ink transfer surface layer 12 is preferably within the range of 0.20 to 2.00 mm. In view of the excellent mobility of ink in a thin width surface layer 12, the thickness being less than 0.20 mm would bring about excess ink supply flow and on the other hand, the thickness being more than 2.00 mm would produce a poor or insufficient ink supply flow.

The porosity of ink transfer layer should not be below 8%. Lower porosities would tend to restrict the ink flow and poor inking would result.

In the above discussion, both the ink storage body 11 and the ink transfer or printing surface layer 12 are comprised of porous material having continuous pores. If the porosity of the storage body 11 is larger than that of the layer 12, ink will flow smoothly from the inside of the body 11 to the outside thereof and towards the layer 12. Thus, during printing operation efficient steady supply of ink can be assured and poor ink supply will be avoided.

The surface of the layer 12 can not avoid being rugged, that is have vertical variations in the surface, due to the shape of the particles employed to form same, even though compression is used. If the depth of this ruggedness is less than 20 microns, and preferably less than 10 microns, the problem of retention of ink in the surface and the problem of blurring of contour shade, can be avoided. The depth of ruggedness, and the degree of porosity can be controlled by controlling the pressure of compression.

FIG. 6 depicts an ink roll which transfers ink to characters or other impressions embossed on a surface of a register or a typewriter, for example. The ink roll of FIG. 6 is formed first by forming a peripheral surface layer 12 of a porous material having continuous pores, such as in the manner of layer 12 in FIG. 5. This is done, for example, by placing resin powder into a mold which has an outside diameter substantially the same as the inner diameter of cylinder 6. Then, the powder is heated and compressed to form the layer 12. Then, the ink storage body 11 is formed within the porous body 12 by feeding raw material powder resin into the resultant layer 12, and compressing the powder under heat. Then, a center shaft 20 is inserted before the storage body 11 is hardened. Since the surface layer 12 of the ink roll comprises powders which were subjected to compression under heat to combine or join the particles together and form a unitary mass having continuous pores therein, the surface 12 has air cavity paths, such as in the manner shown in FIG. 4. The diameters of the cavities are substantially the same and do not vary greatly. The compressive pressure used to form layer 12 onto the inside of the cylinder 6 is suitably controlled to produce a porosity of the porous surface layer to be within the range of 8 to 30%. Similarly, the compressive pressure is suitably controlled in forming body 11 as to produce a predetermined porosity thereof, being greater than the porosity of layer 12.

In the above example, resins are supplied under pressure in a stepwise manner into cylinder 6 to produce the ink roll. It is also possible to prepare the ink roll by using a centrifugal method. In the above example, the ink transfer surface layer 12 was used to illustrate the principles of the invention, and the application thereof, such as for example in a printing device or utensil, or in a ink roll as used for example in registers and typewriters. Numerous other applications are apparent. For example, the invention may be used in a printing member for a rotating type numbering machine. Such machine employes an endless belt with intervals fitted with ink storage bodies and ink transfer surfaces. The ink transfer surfaces would have the desired numbers or letters embossed therein. The belt serves to hold the ink storage body and ink transfer surface. Advantageously, the present technique can be employed to produce a much more advantageous endless belt numbering machine. Female molds (not shown) having a plurality of numbers in a straight line, such as shown in FIG. 5, may be used. A plurality of molds, one for each line, can also be used, with the area above the mold such as numeral 4B in FIG. 5 used to form the belt without the necessity of using added cloth or other belt material. Penetration of ink into the belt may be prevented by using material of the non-penetration type. After molding the ink transfer surface layer 12, the ink storage body is molded, all in the manner as discussed above. Then, the belt portion is further molded by compression onto the flat area 4B of FIG. 4, and connection effected of all of the unitary surface layer 12 and ink storage bodies 11 for each line or series of numbers. Compressing the resin on the hard surface of the mold would further enable the belt to be non-penetrative, and would also act as the belt and hold the printing members comprising the storage body and surface layer. Advantageously, the entire body, and printing members comprising the body and surface, can be made using the inventive method, and without use of other materials, such as cloth. Thus, the invention requires fewer steps than prior art methods, and is thus further advantageous.

According to the invention, the structure of the ink transfer surface layer unexpectedly produces uniform ink flow. Advantageously, ink within the storage body can move uniformly and smoothly to the ink transfer surface. Thus, advantageously, the depth of contour shade of the characters or symbols printed by the ink transfer surface is uniform regardless of the number of times the ink transfer surface is repeatedly used. As shown in the upper curve of FIG. 2, the depth of the contour shade can be kept substantially uniform during extended repeated operation of the ink transfer surface, until, of course, the ink supply becomes exhausted. This surprising effect is obtained by forming the printing surface layer 12 with powder of less than 50 microns, when the powder is formed of porous resins, and less than 30 microns, when the powder is formed or other types of resins. Further, this result is due to the porosity of the ink transfer surface layer being between 8 to 30%. Accordingly, oversaturation of ink in the printing surface layer is avoided. Moreover, even if excessive printing load is applied to the printing member, there will be no problem of ink overflowing on the printing surface. Moreover, the depth of surface ruggedness is preferably within the range of less than 20 microns. Thus, excessive ink is not retained on the surface, and a clear contour shading results.

The invention will now be further illustrated with actual examples.

EXAMPLE 1

Pellets of thermoplastic polyurethane resin "TEXIN 385" (a registered USA trademark) were powdered by pulverizing with a pulverizer. The obtained powder was dispersed into water to make a slurry thereof, which was then filtered with a filter of wire mess of 400 mesh size, to obtain 37 micron size powder. The powder was placed into a female mold of 5 mm depth size to form a printing surface, such as shown in FIG. 5, until the thickness of the powder was 5 mm. Then, the powder was heated at 160° C. for 5 min. and the powder in the female mold was compressed using a corresponding male mold, to make a rigid polyurethane mass wherein the particles were connected together with continuous pores therein. Then, only this rigid mass body, which was still in the female mold, a further charge of powders of 80 mesh size was placed to overflow the mold by 5 mm. The resultant overflowing charge was heated at 160° C. for 5 min. Then, pressure of compression was applied thereto and to the already compressed 400 mesh particles, to form a printing member comprising an ink transfer surface layer and an ink storage body, wherein the two sections were intimately joined together in a unitary structure with continuous cavities therein. The surface layer had a porosity of 9%, ruggedness of 8 microns on its surface, and a thickness of 0.8 mm. The ink storage body had a porosity of 30% and thickness of 2 mm. After using the printing member or device continuously or intermittendly a number of times, it was found that the contour of the characters printed had only a very slight lightening effect, when initially printed. Thereafter, no lightening effect was observed, and the shade depth of the printed characters was observed to be uniform and constant. (See the upper curve in FIG. 2).

EXAMPLE 2

100 g of thermoplastic polyurethane resin latex (Tradename Dainichi Seika made W-7540) was admixed with foaming stabilizer agent of 4 g, 5 g of foam regulating agent, 5 g of crosslinking agent and 0.5 g of accelerator for cross linking. The resultant mixture was foamed nearly twice as large as the original volume by using a mixer, and was poured and developed onto a glazed paper to dry it at 120° C. for 10 min. The polyurethane resin so obtained was powdered using a grinder, to obtain powder size of 40 microndiameter. It was obtained by sieving through a dry stainless wire mesh of 350 mesh size. In order to form a printing member, the above powder was treated in the same manner as in Example 1, i.e. through steps of placing the powder into a female mold, heating it at 150° C. for 5 min., compressing it with a male mold, again adding a second charge of powder onto the previously compressed powder mass and compressing the added powder and compressed mass, at a heated state, to form surface layer portion of Example 1 type, and then placing the powder of Texin 385 used in Example 1 of size of 80 mesh onto the previously compressed surface portion to form an ink storage body of Example 1 type. Thus, was formed a printing member having a ink transfer surface layer portion with a thickness of 1.8 mm, porosity of 18%, and ruggedness depth of 18 microns at the surface. The ink storage body had a porosity of 30%. The quality of the obtained printing member was so superior that the shade contour of the character printed continuously and repeated was always clear and constant in its shade. Only at the beginning of the printing was there initially slightly deeper shade for a few characters.

EXAMPLE 3

Prepolymer was prepared by reacting 100 g of polybutyleneadipate (0.101 mole) of mean molecular weight of 992 and 33.1 g (0.132 mol) of 4,4-diphenyl methane diisocyanate at 80° C. for 5 hours, under nitrogen gas. The obtained prepolymer was reacted with 2.86 g (0.032 mol) of 1,4-butanol at 75° C. for 5 hours. The obtained thermoplastic polyurethane was dissolved with dimethyl formamide to make a 30% solution. A base material was covered with this solution to a thickness of 0.2 mm and then immersed into water in order to coagulate the solution and then washed with water to remove dimethylformamide, then dried and crushed with a crusher into powder. This powder was sieved with a 350 mesh stainless steel wire mesh to obtain a powder of less than 44 microns diameter size. The 44 microns size powder was employed in the method of Example 1. The obtained printing surface layer portion had a porosity of 25%, thickness of 0.8 mm and a ruggedness depth of 5 microns. Then, employing powder of polyurethane of 8 mesh size, the ink storage body was prepared upon the surface layer portion as in Example 1. The obtained printing member comprising a unitary structure of the ink storage body and the ink transfer surface layer, was tested by continuous and intermittent repeated printing. At the beginning stage, there was observed fewer depressions of contour shade depth. Through the remaining stages, there was observed a uniform, and constant slightly deeper shade.

EXAMPLE 4

Prepolymer having isocyanate end group was prepared by letting 1900 g (0.95 mol) of polyethylene adipate having a mean molecular weight of 2000, 740 g (2.96 mol) of 4,4-diphenylmethane diisocyanate and 100 g (0.0649 mol) of polyoxyethyleneglycol of mean molecular weight of 1540, react at 90° C. for 1 hour under nitrogen gas. 180 g (2 mol) of 1,4-butanediol and 6813 g of methylethylketone were admixed with the obtained prepolymer system. The obtained mixture was heated at 80° C. for 4 hours. Thus there was obtained a methylethylketone solution of polyurethane of concentration of 30%. The polyurethane contained polyoxyethylene group of 3.42 weight % and had a molecular structure such that its one hydroxyl group corresponded to its molecular weight of 26.594. In order to obtain an aqueous dispersed liquor of viscosity of 8000 c.p.s., 800 g of the above methylethylketone solution of polyurethane and 30 g of methylethylketone solution of diphenylmethane diisocyanate of 30% concentration was mixed together and under agitation with an agitator, and 1170 g of water was gradually admixed thereinto. The obtained dispersion liquor was equal in type to that of Example 1, i.e. oil dispersed in water type. The obtained dispersion liquor was developed on a glass plate and dried in a drier under air current of 70° C. for 15 min. to obtain a film having tiny pores. The resultant porous film was reduced to powder by using a pulverizer. In accordance with the method of Example 1, a printing member comprising a unitary structure of an ink storage portion and an ink transfer surface layer, was produced (i.e. forming a surface layer portion which had a porosity of 10%, ruggedness depth of 10 microns, and thickness of 0.3 mm) by placing the powder in a female mold, heating at 120° C. for 5 min., compressing it by using a male mold. Then charged thereon (to form the ink storage body having a porosity of 30%) 120 mesh powder, heating at 125° C. for 5 min and compressing. The obtained printing member showed superior properties, similar to the results in Example 3.

EXAMPLE 5

A mixture of 1 mol of polyethyleneglycol of mean molecular weight of 1500, 5 mol of dimethylterephthalate, 9 mol of ethyleneglycol and catalytic amount of magnesium methylate, was heated at 195° C. for 3 hours removing methanol, and then the mixture was heated at 280° C. under pressure of less than 1 mm Hg for 10 hours, expelling ethyleneglycol. There was produced polyester-polyether block copolymer of which the melting point was 189° C. and softening point was 179° C. 10 g of the block polymer was dissolved into 90 g of chloroform. The obtained block copolymer solution of 100 g were admixed with water of 0.5 g and 10 g, respectively, and well stirred, shaken and defoamed by vacuuming. In order to obtain porous film, each solution was developed on a glass plate and dried at room temperature removing chloroform selectively and then heated at 120° C. for 5 min to remove water moisture. Powder which was obtained by pulverizing the porous film was sieved into two sizes, i.e. 400 mesh size and 80 mesh size. Powder of 400 mesh size was placed first in a female mold, as in the case of Example 1, heated at 150° C. for 5 min., compressed with a male mold, and then, as in Example 1, a second charge of powder this time of 80 mesh was added on top of the obtained compressed portion up to a height of 4 mm, and then heated at 150° C. for 5 min. and at this temperature the added powder and compressed portion were compressed. There was thusly prepared a printing device which had a printing surface layer portion having a porosity of 15%, thickness of 0.9 mm, and a ruggedness depth of 12 microns. When tested, the device produced contour shade of the printed characters of a grade between the results of Example 1 and Example 2.

COMPARATIVE EXAMPLE 1

A printing member having an ink transfer surface layer of porosity 10%, surface ruggedness depth of 8 micron and thickness of 2.8 mm (above the range of the present invention), was prepared by the method steps of Example 1, except that the ink storage body was not formed. Thus, there was first placed into a female mold the powders of less than 37 micron size of Texin 385, heated at 160° C. for 5 min., and compressed at this temperature for 5 min. The produced printing member was tested by continuous repeated printing. The results were as shown in the bottom curve of FIG. 2, namely, that there was observed a depression of contour shade depth of the character printed, that is, the shades of the color got lighter with each repeated impression.

COMPARATIVE EXAMPLE 2

Figure 2:
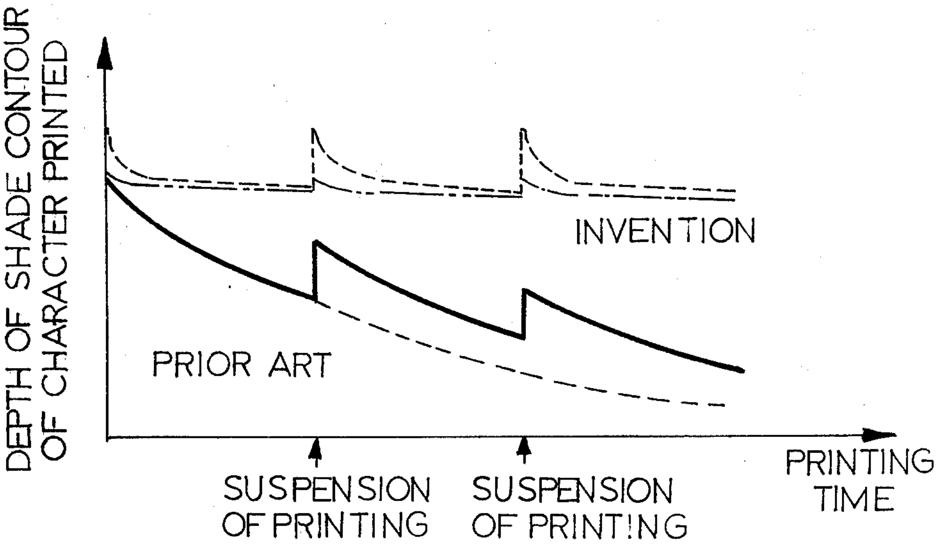
FIG. 2 depicts the degree of coloring with each repeated impression, using prior art ink transfer surface layers and the inventive ink transfer surface layers.

In lieu of the powder of 35 micron size used in Example 1, powders of over 50 to 150 microns size (above the range of the present invention) were used in this comparative example, and in the same manner as in Example 1. The powder was placed in the female mold, heated and compressed to produce an ink transfer surface layer of a porosity of 9%, surface ruggedness depth of 30 microns (above the range of the present invention) and a thickness of 0.8 mm. An ink storage body was prepared in the same manner as in Example 1, with a porosity of over 30%. Using this printing member, tests were made by a series of continuous repeated printings. As shown in FIG. 2, bottom curve, the depth of contour shade of the printed material decreased with each repeated printing.

COMPARATIVE EXAMPLE 3

Surface layer portion was prepared according to the manner of Example 3, except that powders were used of sizes 100 to 150 microns (above the range of the present invention). The ink transfer surface layer produced was found to have a porosity of 25%, ruggedness depth of the surface of 25 microns (above the range of the present invention) and a thickness of 0.8 mm. An ink storage body was formed which had a porosity of 40%. In testing the produced printing device, continuous repeated impressions were made. It was observed that the contour depth shade of the characters printed showed no abnormality. But, at the beginning stage, the depth of contour shade was abnormally deep with blurs. Overinking was also observed.

COMPARATIVE EXAMPLE 4

A printing member was prepared using the same method as in Example 3, except that the powders of 44 microns (above the range of the present invention) were placed in a female mold to a depth of 1 mm. The obtained printing member comprised a surface layer portion having a viscosity of 25%, ruggedness depth of 5 microns, and a thickness of 0.15 mm (below the range of the present invention). An ink storage body formed by the same method had a porosity of 40%. Continuous repeated printing was used to test the device. It was observed that the device consumed ink abnormally rapidly, and the life thereof was substantially shortened.

For sake of clarification, it should be noted that the porosity and thickness of the ink transfer surface layer refers to that portion of the device which forms the ink transfer or printing portion, and does not refer to the ink storage portion which is intimately joined thereto to form the device.

The foregoing description is illustrative of the principles of the invention. Numerous variations and extensions thereof would be apparent to the worker skilled in the art. All such extensions and variations are to be considered to be within the spirit and scope of the invention.

What is claimed is:

1. An ink transfer device comprising a molded resilient ink transfer layer of heat compressed thermoplastic resin powder having particles of sizes of less than 50 microns in diameter with an ink transfer surface on one side thereof, with continuous pores therein, and thickness of 0.2 to 2 mm, and porosity of 8 to 30%, and inking surface variation of less than 20 microns; and a molded resilient ink storage layer having one side thereof connected to the side of said ink transfer layer opposite said ink transfer surface and consisting essentially of heat compressed thermoplastic resin powder having particles of sizes larger than that of said ink transfer layer and further having pore size, porosity and thickness greater than said ink transfer layer; whereby said pores in both said ink transfer and ink storage layers are continuous and communicated with each other; and whereby the magnitude of ink flow current to the inking surface is limited by the ink transfer layer and not by the ink storage layer; and whereby the ink is substantially at said ink transfer surface when ink is in said ink transfer layer.

2. The device of claim 1, wherein said resin powder is less than 30 microns prior to heat compression.

3. The device of claim 1, wherein said porosity is between 10% and 25%.

4. The device of claim 1, wherein said surface variation is less than 10 microns.

* * * * *